United States Patent
Anantharaman et al.

(10) Patent No.: US 10,585,641 B2
(45) Date of Patent: Mar. 10, 2020

(54) TAGGING A SOUND IN A VIRTUAL ENVIRONMENT

(71) Applicant: QUALCOMM Incorporated, San Diego, CA (US)

(72) Inventors: Chetan Anantharaman, San Diego, CA (US); Bharath Kumar Tirunagaru, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 31 days.

(21) Appl. No.: 15/967,305

(22) Filed: Apr. 30, 2018

(65) Prior Publication Data
US 2019/0332352 A1    Oct. 31, 2019

(51) Int. Cl.
| | |
|---|---|
| G06F 3/048 | (2013.01) |
| G06F 3/16 | (2006.01) |
| G06F 3/0484 | (2013.01) |
| H04R 5/027 | (2006.01) |
| H04R 5/02 | (2006.01) |
| A63F 13/54 | (2014.01) |

(52) U.S. Cl.
CPC .......... *G06F 3/167* (2013.01); *G06F 3/04842* (2013.01); *H04R 5/02* (2013.01); *H04R 5/027* (2013.01); *A63F 13/54* (2014.09)

(58) Field of Classification Search
None
See application file for complete search history.

(56) References Cited

U.S. PATENT DOCUMENTS

| | | |
|---|---|---|
| 9,396,588 B1 | 7/2016 | Li |
| 2017/0109131 A1 | 4/2017 | Boesen |
| 2017/0230760 A1 | 8/2017 | Sanger et al. |
| 2018/0046432 A1 | 2/2018 | Derungs |
| 2018/0160251 A1* | 6/2018 | Sanger .................... H04S 3/008 |

FOREIGN PATENT DOCUMENTS

WO      2018013237 A1    1/2018

* cited by examiner

*Primary Examiner* — Tuan S Nguyen
(74) *Attorney, Agent, or Firm* — Moore Intellectual Property Law, PLLC

(57) ABSTRACT

A method includes generating, at a processor, a first virtual scene that includes a virtual object. The method also includes generating a user option to insert a virtual microphone into the first virtual scene. The user option enables user selection of a location of the virtual microphone. The method further includes generating a second virtual scene. The method also includes outputting a tagged sound associated with the virtual object while a display device displays the first virtual scene. The method further includes outputting the tagged sound while the display device displays the second virtual scene in response to a determination that the virtual microphone is inserted into the first virtual scene. Properties of the tagged sound are based on the location of the virtual microphone while the display device displays the second virtual scene.

21 Claims, 8 Drawing Sheets

TAGGING A SOUND IN A VIRTUAL ENVIRONMENT

I. FIELD

The present disclosure is generally related to generation of audio.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Some devices enable the use of virtual reality functions. For example, video gaming console units may display a virtual scene (e.g., a video game scene) on a display device and may enable a user to perform functions within the virtual scene. A speaker may output sounds associated with the virtual scene while the virtual scene is displayed at the display device. As a non-limiting example, if the user is playing a video game and positions an avatar of the video game within a first virtual scene (e.g., a virtual room), the first virtual scene is displayed at the display device and the speaker outputs sounds of virtual objects within the first virtual scene. However, sound of virtual objects in different virtual scenes of the video game may not be available to the user while the first virtual scene is displayed. As a result, the user may not be aware of events occurring in the video game that are not associated with the first virtual scene.

III. SUMMARY

According to one implementation of the techniques disclosed herein, an apparatus includes a display device and a processor coupled to the display device. The processor is configured to generate a first virtual scene that includes a virtual object. The processor is also configured to generate a user option to insert a virtual microphone into the first virtual scene. The user option enables user selection of a location of the virtual microphone. The processor is also configured to generate a second virtual scene. The apparatus further includes a speaker coupled to the processor. The speaker is configured to output a tagged sound associated with the virtual object while the display device displays the first virtual scene. The speaker is also configured to output the tagged sound while the display device displays the second virtual scene in response to a determination that the virtual microphone is inserted into the first virtual scene. Properties of the tagged sound are based on the location of the virtual microphone while the display device displays the second virtual scene.

According to another implementation of the techniques disclosed herein, a method includes generating, at a processor, a first virtual scene that includes a virtual object. The method also includes generating a user option to insert a virtual microphone into the first virtual scene. The user option enables user selection of a location of the virtual microphone. The method further includes generating a second virtual scene. The method also includes outputting a tagged sound associated with the virtual object while a display device displays the first virtual scene. The method further includes outputting the tagged sound while the display device displays the second virtual scene in response to a determination that the virtual microphone is inserted into the first virtual scene. Properties of the tagged sound are based on the location of the virtual microphone while the display device displays the second virtual scene.

According to another implementation of the techniques disclosed herein, a non-transitory computer-readable medium includes instructions that, when executed by a processor, cause the processor to perform operations including generating a first virtual scene that includes a virtual object. The operations also include generating a user option to insert a virtual microphone into the first virtual scene. The user option enables user selection of a location of the virtual microphone. The operations further include generating a second virtual scene. The operations also include outputting a tagged sound associated with the virtual object while a display device displays the first virtual scene. The operations further include outputting the tagged sound while the display device displays the second virtual scene in response to a determination that the virtual microphone is inserted into the first virtual scene. Properties of the tagged sound are based on the location of the virtual microphone while the display device displays the second virtual scene.

According to another implementation of the techniques disclosed herein, an apparatus includes means for generating a first virtual scene and a second virtual scene. The first virtual scene includes a virtual object. The apparatus also includes means for generating a user option to insert a virtual microphone into the first virtual scene. The user option enables user selection of a location of the virtual microphone. The apparatus also includes means for outputting a tagged sound associated with the virtual object. The tagged sound is outputted while means for displaying a virtual scene displays the first virtual scene. The tagged sound is outputted while the means for displaying displays the second virtual scene in response to a determination that the virtual microphone is inserted into the first virtual scene. Properties of the tagged sound are based on the location of the virtual microphone while the means for displaying displays the second virtual scene.

Other implementations, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first, " "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" content (or a signal) may refer to actively generating, estimating, calculating, or determining the content (or the signal) or may refer to using, selecting, or accessing the content (or signal) that is already generated, such as by another component or device. Additionally, as referred to herein, the term "continuously" means to perform an operation without breaks or pauses.

Figure 1:
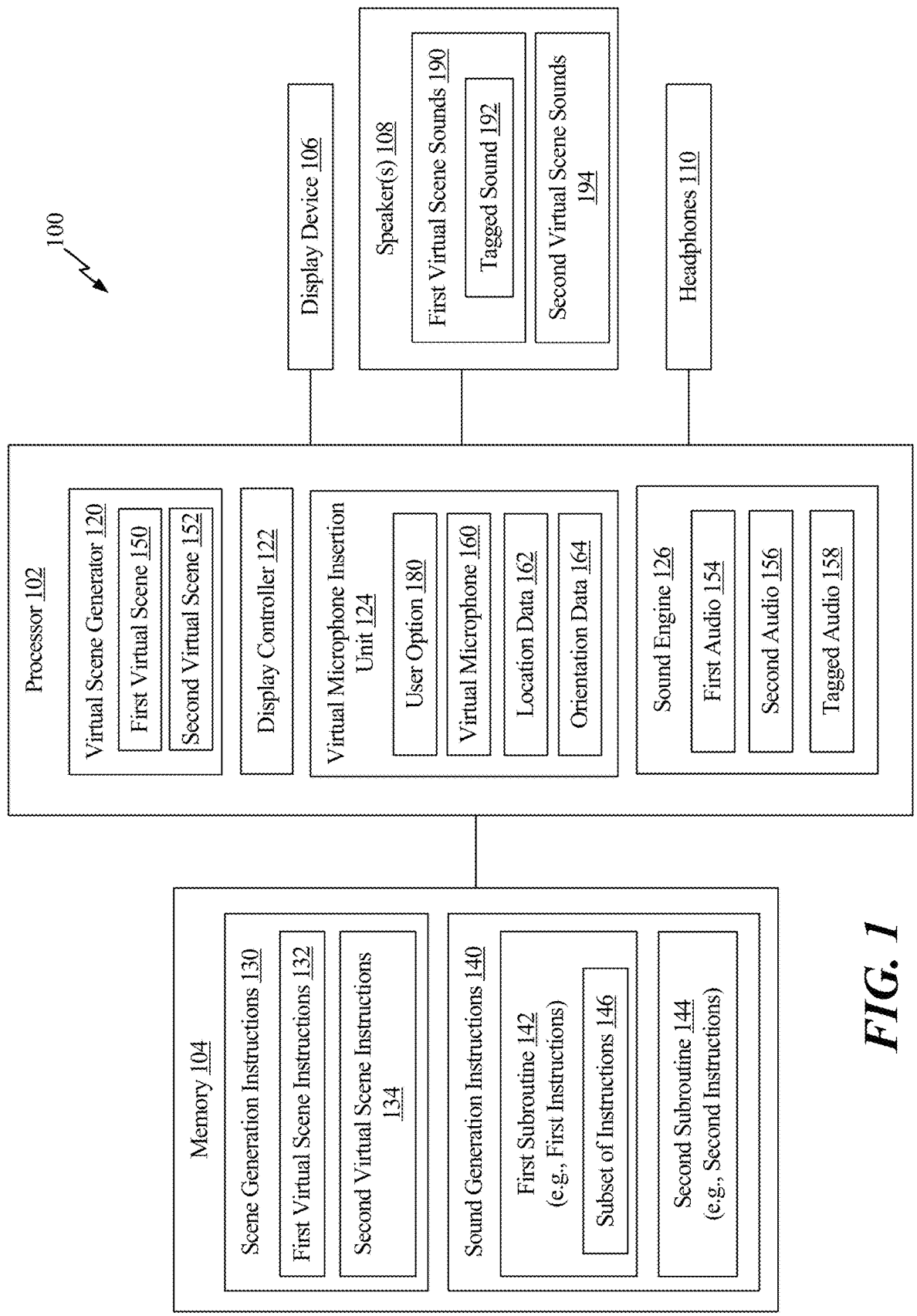
FIG. 1 is a block diagram of an illustrative example of a system that is operable to tag a sound in a virtual environment.

Referring to FIG. 1, a system 100 that is operable to tag a sound in a virtual environment is shown. The system 100 includes a processor 102 and a memory 104 coupled to the processor 102. According to one implementation, the memory 104 is a non-transitory computer-readable medium that stores instructions that are executable by the processor 102. The system 100 also includes a display device 106 coupled to the processor 102, one or more speakers 108 coupled to the processor 102, and headphones 110 coupled to the processor 102.

Although the one or more speakers 108 and the headphones 110 are illustrated in FIG. 1, in some implementations, the system 100 includes the one or more speakers 108 and does not include the headphones 110. As a non-limiting example, the system 100 may correspond to a video game system that includes the one or more speakers 108 configured to output sounds associated with virtual images displayed at the display device 106. A user experiences (e.g. hears) the sounds by sitting or standing in proximity to the one or more speakers 108. According to other implementations, the system 100 includes the headphones 110 and does not include the one or more speakers 108. For example, the headphones 110 may be configured to output sounds associated with virtual images displayed at the display device 106. The user experiences the sounds by placing the headphones 110 over the user's ears.

The processor 102 includes a virtual scene generator 120, a display controller 122, a virtual microphone insertion unit 124, and a sound engine 126. The virtual scene generator 120 is configured to generate different virtual scenes 150, 152. As a non-limiting example, if the system 100 corresponds to video game system, the virtual scene generator 120 generates a first virtual scene 150 of a video game, a second virtual scene 152 of the video game, a third virtual scene (not depicted) of the video game, etc.

To generate the different virtual scenes 150, 152, the virtual scene generator 120 retrieves and executes scene generation instructions 130 from the memory 104. In FIG. 1, the scene generation instructions 130 include first virtual scene instructions 132 (e.g., a first virtual scene subroutine) and second virtual scene instructions 134 (e.g., a second virtual scene subroutine). It should be understood that in other implementations, the scene generation instructions 130 may include additional virtual scene instructions. The virtual scene generator 120 retrieves the first virtual scene instructions 132 from the memory 104 and executes the first virtual scene instructions 132 to generate the first virtual scene 150. In response to the virtual scene generator 120 generating the first virtual scene 150, the display controller 122 is configured to display the first virtual scene 150 at the display device 106. In a similar manner, the virtual scene generator 120 retrieves the second virtual scene instructions 134 from the memory 104 and executes the second virtual scene instructions 134 to generate the second virtual scene 152. In response to the virtual scene generator 120 generating the second virtual scene 152, the display controller 122 is configured to display the second virtual scene 152 at the display device 106.

As different virtual scenes are generated and displayed, the sound engine 126 executes corresponding subroutines to render accompanying audio for the virtual scenes. To illustrate, the sound engine 126 retrieves and executes sound generation instructions 140 from the memory 104. In FIG. 1, the sound generation instructions 140 include a first subroutine 142 (e.g., first sound instructions) and a second subroutine 144 (e.g., second sound instructions). The first subroutine 142, when executed by the sound engine 126, is used to render first audio 154 for the first virtual scene 150. For example, if the first virtual scene 150 is displayed at the display device 106, the sound engine 126 executes the first subroutine 142 to render the first audio 154 for the first virtual scene 150. The rendered first audio 154 may be output by the one or more speakers 108, the headphones 110, or both, as first virtual scene sounds 190. The second subroutine 144, when executed by the sound engine 126, is used to render second audio 156 for the second virtual scene 152. For example, if the second virtual scene 152 is displayed at the display device 106, the sound engine 126 executes the second subroutine 144 to render the second audio 156 for the second virtual scene 152. The rendered second audio 156 may be output by the one or more speakers 108, the headphones 110, or both, as second virtual scene sounds 194.

In some scenarios, a user may want to hear sounds (e.g., a tagged sound 192) from the first virtual scene 150 while the second virtual scene 152 is displayed at the display device 106. As a non-limiting example, if the user is playing a video game, it may be of interest to the user to hear the sounds from the first virtual scene 150 (while the second virtual scene 152 is displayed) to determine whether there is any action or movement in the first virtual scene 150. The system 100 provides techniques to tag sounds associated with the first virtual scene 150 so the user can continuously hear the tagged sounds 192 regardless of which virtual scene is depicted at the display device 106.

To illustrate, the virtual microphone insertion unit 124 is configured to generate a user option 180 to insert a virtual microphone 160 (e.g., a sound tagging mechanism) into the first virtual scene 150. The user option 180 enables a selection of a location of the virtual microphone 160 and may also enable user selection of an orientation of the virtual microphone 160. The virtual microphone insertion unit 124 generates location data 162 indicating the user-selected location of the virtual microphone 160 and may generate orientation data 164 indicating a user-selected orientation of the virtual microphone 160. To illustrate, the user option 180 may enable the user to insert the virtual microphone 160 near a virtual object (e.g., a virtual telephone) in the first virtual scene 150 with the virtual microphone 160 oriented to face the virtual object. The location data 162 may indicate that the virtual microphone 160 is located near the virtual object and the orientation data 164 may indicate that the virtual microphone 160 is facing the virtual object.

If the user controls an avatar to move to the second virtual scene 152, such that the second virtual scene 152 is displayed at the display device 106, a tagged sound (e.g., a telephone ringer) associated with the virtual object is output by the one or more speakers 108 (or the headphones 110) in response to inserting the virtual microphone 160 near the virtual object. For example, the sound engine 126 is configured to identify metadata (e.g., the location data 162 and the orientation data 164) that indicates the location and the orientation of the virtual microphone 160 upon insertion of the virtual microphone 160 into the first virtual scene 150. Based on the metadata, the sound engine 126 is configured to identify a subset of instructions 146 in the first subroutine 142 that, upon execution by the sound engine 126, results in the rendering of audio (e.g., tagged audio 158) at the location and orientation of the virtual microphone 160.

Thus, the subset of instructions 146, when executed by the sound engine 126, is used to render tagged audio 158 for the location and orientation of the virtual microphone 160 (e.g., render tagged audio 158 for the virtual telephone). The sound engine 126 may continuously execute the subset of instructions 146 to render the tagged audio 158 for the location and orientation of the virtual microphone 160. Thus, if the second virtual scene 152 is displayed at the display device 106, the sound engine 126 executes the second subroutine 144 and the subset of instructions 146 in the first subroutine 142 to render the second audio 156 for the second virtual scene 152 and the tagged audio 158. The rendered second audio 156 is output as second virtual scene sounds 194 by the speakers 108, and the rendered tagged audio 158 is output as the tagged sound 192 by the speakers 108.

Thus, the system 100 of FIG. 1 enables the user to tag a location (or virtual object) within the first virtual scene 150 so that the audio associated with the location (e.g., the tagged audio 158) can be heard regardless of whether the first virtual scene 150 is displayed at the display device 106. For example, the user option 180 enables the user to insert the virtual microphone 160 into the first virtual scene 150. In response to inserting the virtual microphone 160, the sound engine 126 continuously executes the subset of instructions 146 to render the tagged audio 158. As used herein, "continuously" executing the subset of instructions 146 corresponds to executing the subset of instructions 146 without breaks or pauses. To illustrate, the sound engine 126 executes the subset of instructions 146 as if the first virtual scene 150 is displayed at the display device 106. Thus, if the second virtual scene 152 is displayed at the display device 106, the sound engine 126 executes the second subroutine 144 and the subset of instructions 146 in the first subroutine 142 to render the second audio 156 for the second virtual scene 152 and the tagged audio 158. The speakers 108 can simultaneously output the second virtual scene sounds 194 based on the rendered second audio 156 and the tagged sound 192 based on the tagged audio 158. As a result, while the second virtual scene 152 is displayed at the display device 106, the user can continuously monitor the tagged location within the first virtual scene 150 by listening to the tagged sound 192 through the speakers 108.

Figure 2A:
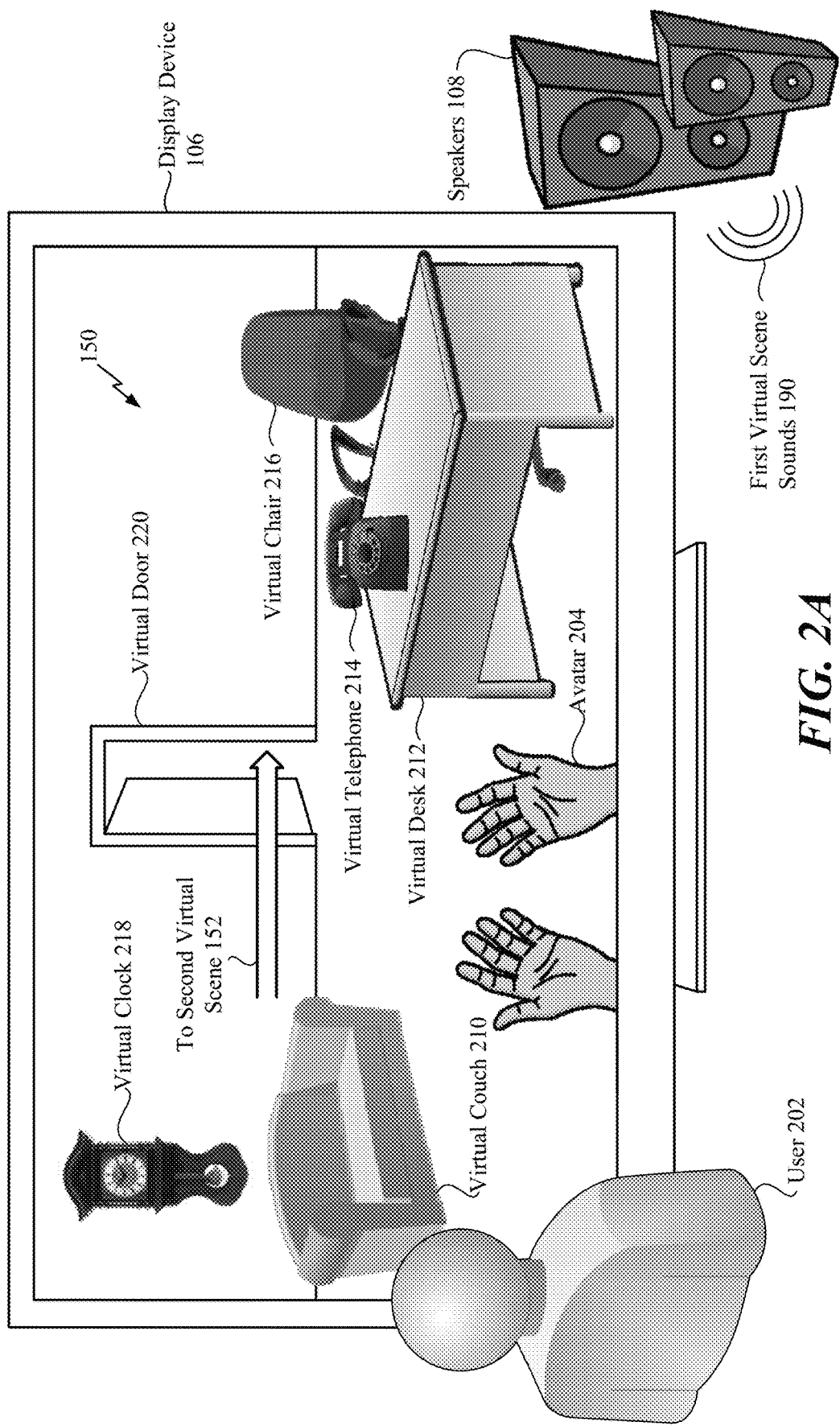
FIG. 2A is a diagram of an illustrative example of a first virtual scene displayed at a display device of the system of FIG. 1.

Referring to FIG. 2A, a diagram of the display device 106 displaying the first virtual scene 150 is shown. The first virtual scene 150 may be a scene within a user-controlled application (e.g., a video game). For example, in FIG. 2A, a user 202 controls an avatar 204 that is located within the first virtual scene 150. In FIG. 2A, the avatar 204 is presented in a first person mode to improve user experience. For example, the first person mode enables the user 202 to feel as if the user 202 is seeing the first virtual scene 150 through the eyes of the avatar 204.

Figure 3:
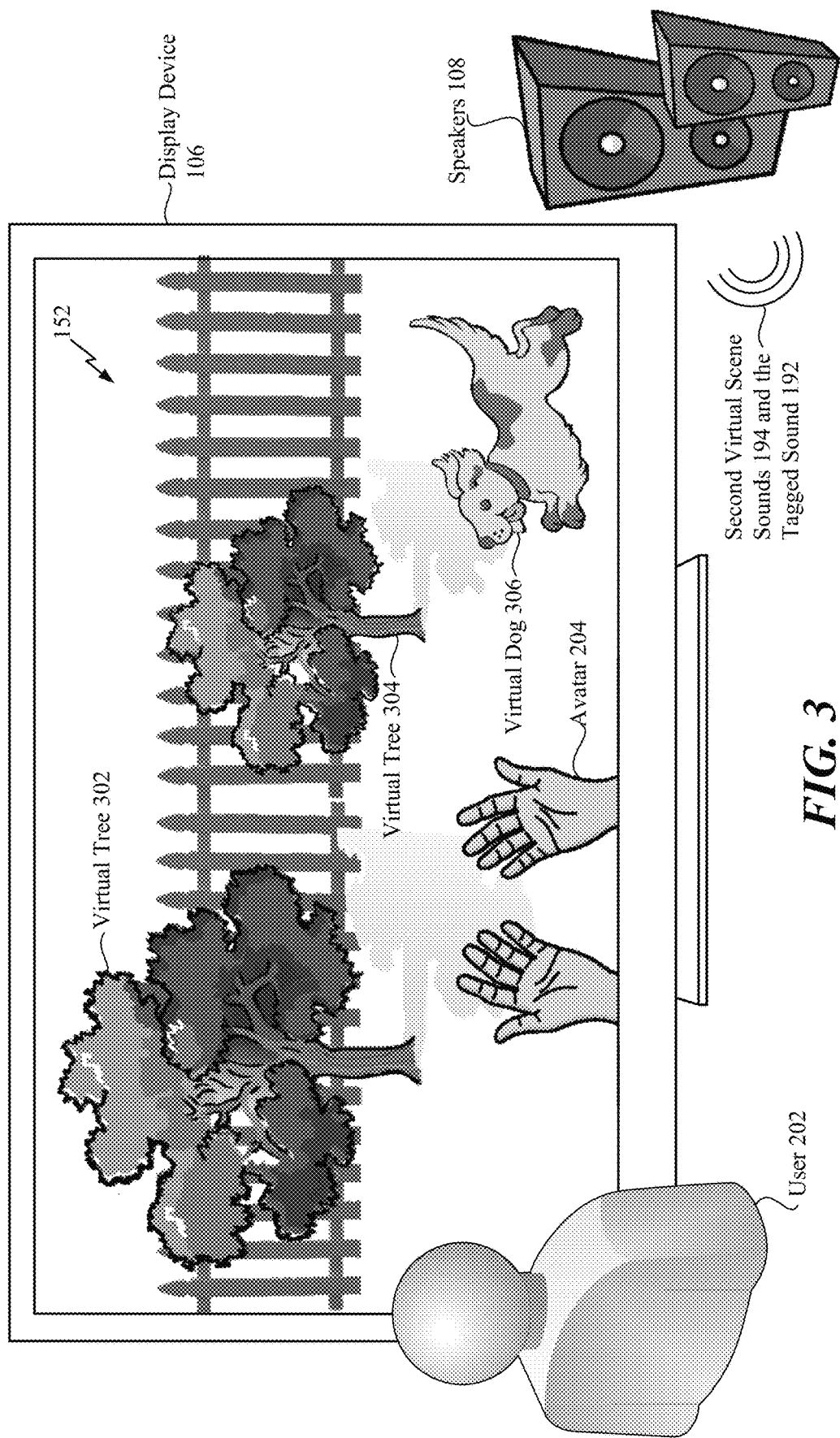
FIG. 3 is a diagram of an illustrative example of a second virtual scene displayed at the display device.

The virtual scene generator 120 executes the first virtual scene instructions 132 to generate the first virtual scene 150 displayed at the display device 106 of FIG. 2A. The first virtual scene 150 includes a plurality of virtual objects. For example, the first virtual scene 150 includes a virtual couch 210, a virtual desk 212, a virtual telephone 214 placed on top of the virtual desk 212, a virtual chair 216 behind the virtual desk 212, a virtual clock 218, and a virtual door 220. The virtual door 220 leads to the second virtual scene 152, as illustrated in FIG. 3. For example, the display device 106 displays the second virtual scene 152 (e.g., the virtual scene generator 120 executes the second virtual scene instructions 134) if the user 202 moves the avatar 204 through the virtual door 220.

While the avatar 204 is located in the first virtual scene 150, the sound engine 126 executes the first subroutine 142 to render the first audio 154, and the speakers 108 (or the headphones 110) output the rendered first audio 154 as the first virtual scene sounds 190. The first virtual scene sounds 190 includes a telephone ringing sound associated with the virtual telephone 214 and a clock ticking sound associated with the virtual clock 218. The sound engine 126 executes the first subroutine 142 to render audio (e.g., the first audio 154) associated with the telephone ringing sound and the clock ticking sound.

According to one implementation, the sound engine 126 executes particular instructions of the first subroutine 142 based on a location of the avatar 204 within the first virtual scene 150. For example, if the avatar 204 is relatively close to the virtual telephone 214, the sound engine 126 may execute particular instructions of the first subroutine 142 that are associated with the telephone ringing sound to enable the user 202 to more clearly hear the telephone ringing sound through the speakers 108 (or the headphones 110). The particular instructions executed by the sound engine 126 may be based on the location of the avatar 204 and the orientation of the avatar 204 with respect to the virtual telephone 214. As a non-limiting example, if the avatar 204 is to the left of the virtual telephone 214, the sound engine 126 may execute particular instructions that result in the speakers 108 outputting the telephone ringing sound spatially panned to the right.

If the avatar 204 is relatively close to the virtual clock 218, the sound engine 126 may execute particular instructions of the first subroutine 142 that are associated with the clock ticking sound to enable the user 202 to more clearly hear the clock ticking sound through the speakers 108 (or the headphones 110). The particular instructions executed by the sound engine 126 may be based on the location of the avatar 204 and the orientation of the avatar 204 with respect to the virtual clock 218. As a non-limiting example, if the avatar 204 is standing within one (virtual) foot of the virtual clock 218, the sound engine 126 may execute particular instructions that result in the speakers 108 outputting the clock ticking sound at a relatively high volume.

Figure 2B:
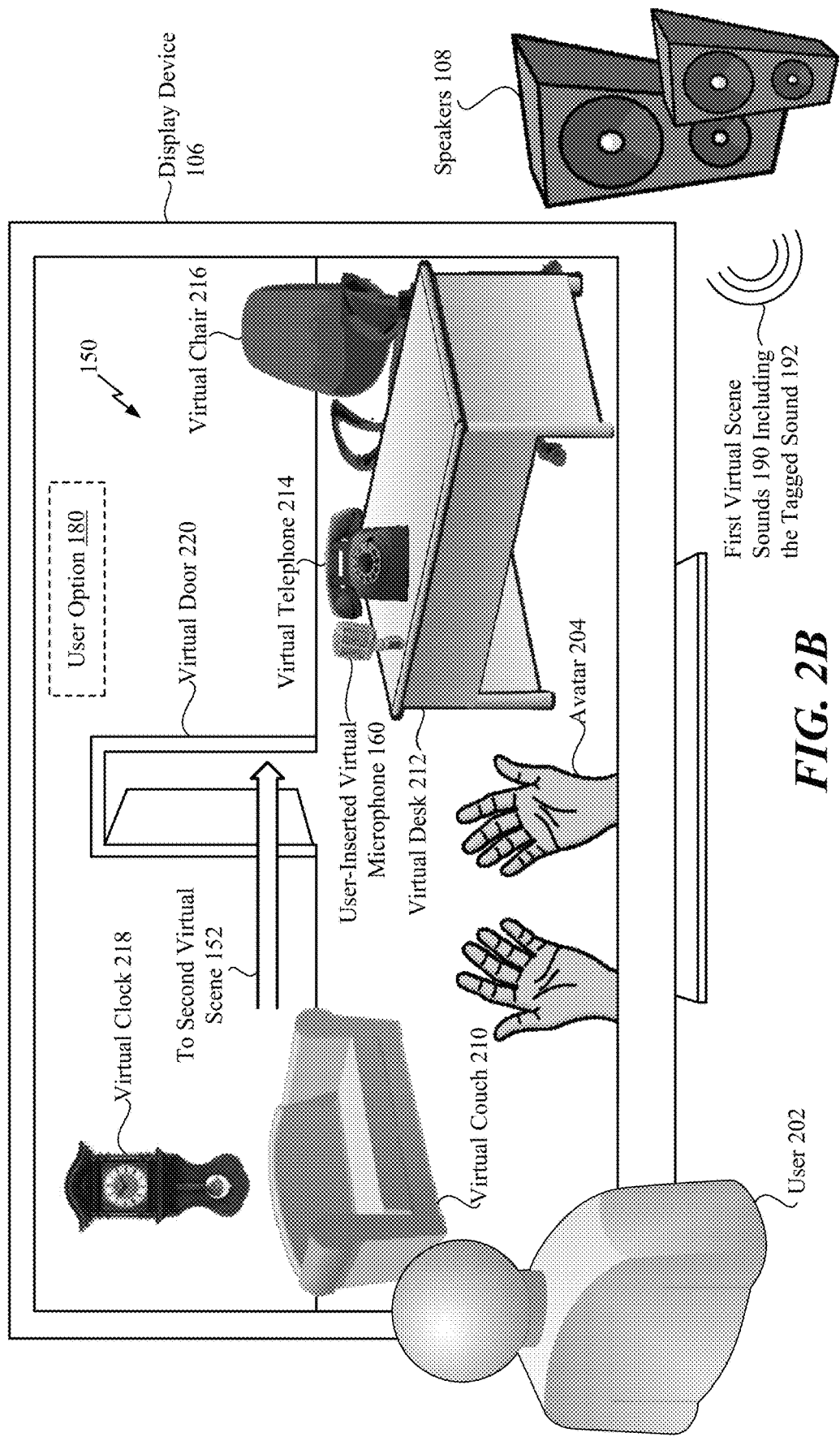
FIG. 2B is a diagram of the first virtual scene with a user-inserted virtual microphone for audio tagging.

Referring to FIG. 2B, a diagram of the display device 106 displaying the first virtual scene 150 with the user-inserted virtual microphone 160 for audio tagging is shown.

In FIG. 2B, the user 202 activates the user option 180 to insert the virtual microphone 160 into the first virtual scene 150. For example, in FIG. 2B, the user 202 inserts the virtual microphone 160 on top of the virtual desk 212 and to the left of the virtual telephone 214. Upon activating the user option 180 and inserting the virtual microphone 160 into the first virtual scene 150, the processor 102 generates the location data 162 and the orientation data 164. The location data 162 indicates that the virtual microphone 160 is located on top of the virtual desk 212 and to the left of the virtual telephone 214, and the orientation data 164 indicates that the virtual microphone 160 is facing towards the virtual telephone 214.

Using the location data 162 and the orientation data 164, the processor 102 "tags" a virtual location in the first virtual scene 150 in order to continuously render audio associated with virtual location. For example, the sound engine 126 identifies the subset of instructions 146 in the first subroutine 142 corresponding to the location data 162 and the orientation data 164. In response to identifying the subset of instructions 146, the sound engine 126 continuously executes the subset of instructions 146 to render the tagged audio 158. In the scenario of FIG. 2B, the tagged audio 158 corresponds to the telephone ringing sound of the virtual telephone 214 because the virtual microphone 160 is proximate to the virtual telephone 214. The rendered tagged audio 158 is provided to the speakers 108 (or the headphones 110) and is output as the tagged sound 192.

Properties of the tagged sound 192 are based on the location of the virtual microphone 160 and the orientation of the virtual microphone 160. For example, the speakers 108 output the tagged sound 102 as if the avatar 204 is located where the virtual microphone 160 is inserted and as if the avatar 204 is oriented in a similar manner as the virtual microphone 160. As an alternative to inserting the virtual microphone 160, other techniques can be used to "tag" a location within the first virtual scene 150. For example, the user 202 can select a particular virtual object within the first virtual scene 150 to tag for continuous audio monitoring. As another example, the user 202 may select an area within the first virtual scene 150 to tag for continuous audio monitoring. Thus, it should be understood that inserting the virtual microphone 160 is only one non-limiting example of tagging sound within a virtual environment.

The techniques described with respect to FIGS. 2A-2B enable the user 202 to tag a location (or virtual object) within the first virtual scene 150 so that the audio associated with the location (e.g., the tagged audio 158) can be heard regardless of whether the first virtual scene 150 is displayed at the display device 106. For example, the user option 180 enables the user to insert the virtual microphone 160 into the first virtual scene 150. In response to inserting the virtual microphone 160, the sound engine 126 continuously executes the subset of instructions 146 to render the tagged audio 158. Thus, if the second virtual scene 152 is displayed at the display device 106, the sound engine 126 executes the second subroutine 144 and the subset of instructions 146 in the first subroutine 142 to render the second audio 156 for the second virtual scene 152 and the tagged audio 158. The speakers 108 can simultaneously output the second virtual scene sounds 194 based on the rendered second audio 156 and the tagged sound 192 based on the tagged audio 158. As a result, while the second virtual scene 152 is displayed at the display device 106, the user 202 can continuously monitor the tagged location within the first virtual scene 150 by listening to the tagged sound 192 through the speakers 108. According to some implementations, the tagged sound 192 may correspond to silence. As a non-limiting example, if the virtual telephone 214 is not ringing and the virtual clock 218 has stopped ticking, the tagged sound 192 may correspond to silence.

Referring to FIG. 3, a diagram of the display device 106 displaying the second virtual scene 152 is shown. The second virtual scene 152 is displayed at the display device 106 if the user 202 moves the avatar 204 through the virtual door 220. The virtual scene generator 120 executes the second virtual scene instructions 134 to generate the second virtual scene 152 displayed at the display device 106 of FIG. 3.

The second virtual scene 152 includes a plurality of virtual objects. For example, the second virtual scene 152 includes a virtual tree 302, a virtual tree 304, and a virtual dog 306. While the avatar 204 is located in the second virtual scene 152, the sound engine 126 executes the second subroutine 144 to render the second audio 156, and the speakers 108 (or the headphones 110) output the rendered second audio 156 as the second virtual scene sounds 194. For example, the second virtual scene sounds 194 include a dog barking sound associated with the virtual dog 306 and leaf ruffling sounds associated with the virtual trees 302, 304.

Additionally, the sound engine 126 executes the subset of instructions 146 in the first subroutine 142 while the avatar 204 is located in the second virtual scene 152 because the virtual microphone 160 was inserted in the first virtual scene 150. Thus, the tagged audio 158 (e.g., the telephone ringing sound) in the first virtual scene 150 is rendered in addition to the second audio 156 in the second virtual scene 152. As a result, the speakers 108 output the tagged audio 158 as the tagged sound 192 in addition to the second virtual scene sounds 194 while the second virtual scene 152 is displayed at the display device 106.

Thus, the techniques described with respect to FIG. 3 enable the user 202 to tag sounds within the first virtual scene 150 so that the tagged sound 158 can be heard when the user 202 moves the avatar 204 to a different virtual scene 152. Thus, while the second virtual scene 152 is displayed at the display device 106, the sound engine 126 executes the second subroutine 144 and the subset of instructions 146 in the first subroutine 142 to render the second audio 156 and the tagged audio 158. As a result, the speakers 108 output the tagged audio 158 as the tagged sound 192 in addition to the second virtual scene sounds 194 while the second virtual scene 152 is displayed at the display device 106, which enables the user 202 to continuously monitor the tagged location within the first virtual scene 150.

Figure 4:
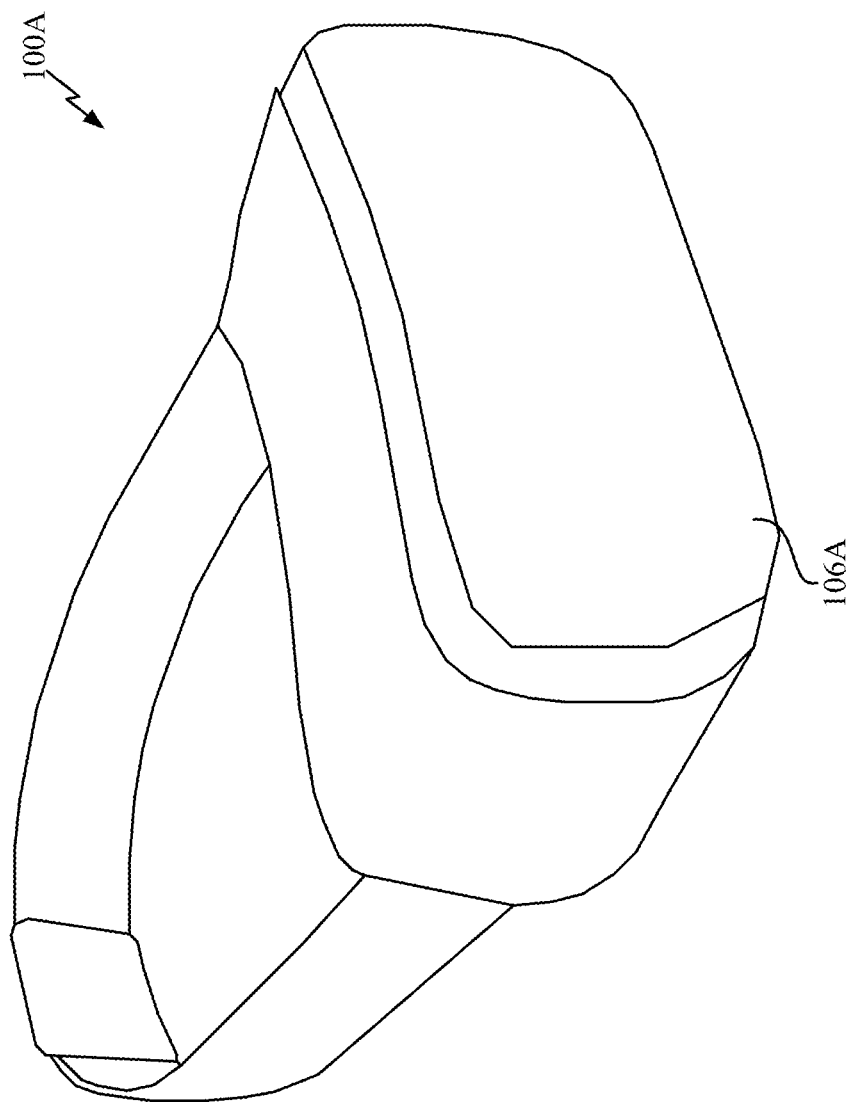
FIG. 4 is a diagram of an illustrative example of a virtual reality headset that is operable to tag a sound in a virtual environment.

Referring to FIG. 4, a diagram of a virtual reality headset 100A is shown. Components of the system 100 may be implemented within the virtual reality headset 100A. For example, the processor 102 and the memory 104 may be integrated into the virtual reality headset 100A.

The virtual reality headset 100A also includes a display device 106A. The display device 106A corresponds to the display device 106 of FIG. 1. The display device 106A is configured to display the first virtual scene 150 and the second virtual scene 152. For example, if the user 202 places the display device 106A over the user's eyes, the user 202 may see the first virtual scene 150. If the user 202 causes the avatar 204 to walk through the virtual door 220, the display device 106A may display the second virtual scene 152. Thus, the display device 106A may create a life-like virtual reality experience for the user 202.

In a similar manner as described with respect to FIGS. 2A-3, the user 202 may select the user option 180 to insert the virtual microphone 160 into the first virtual scene 150 (or tag a particular area within the first virtual scene 150) while the first virtual scene 150 is displayed at the display device 106A. In response to inserting the virtual microphone 160 in the first virtual scene 150, the sound engine 126 continuously executes the subset of instructions 146 to render the tagged audio 158. The rendered tagged audio 158 is provided to headphones (not shown) of the virtual reality headset 100A and is output as the tagged sound 192. As a result, if the avatar 204 walks through the virtual door 220 to the second virtual scene 152, the user 202 can continuously monitor audio activity in the first virtual scene 150.

Figure 5:
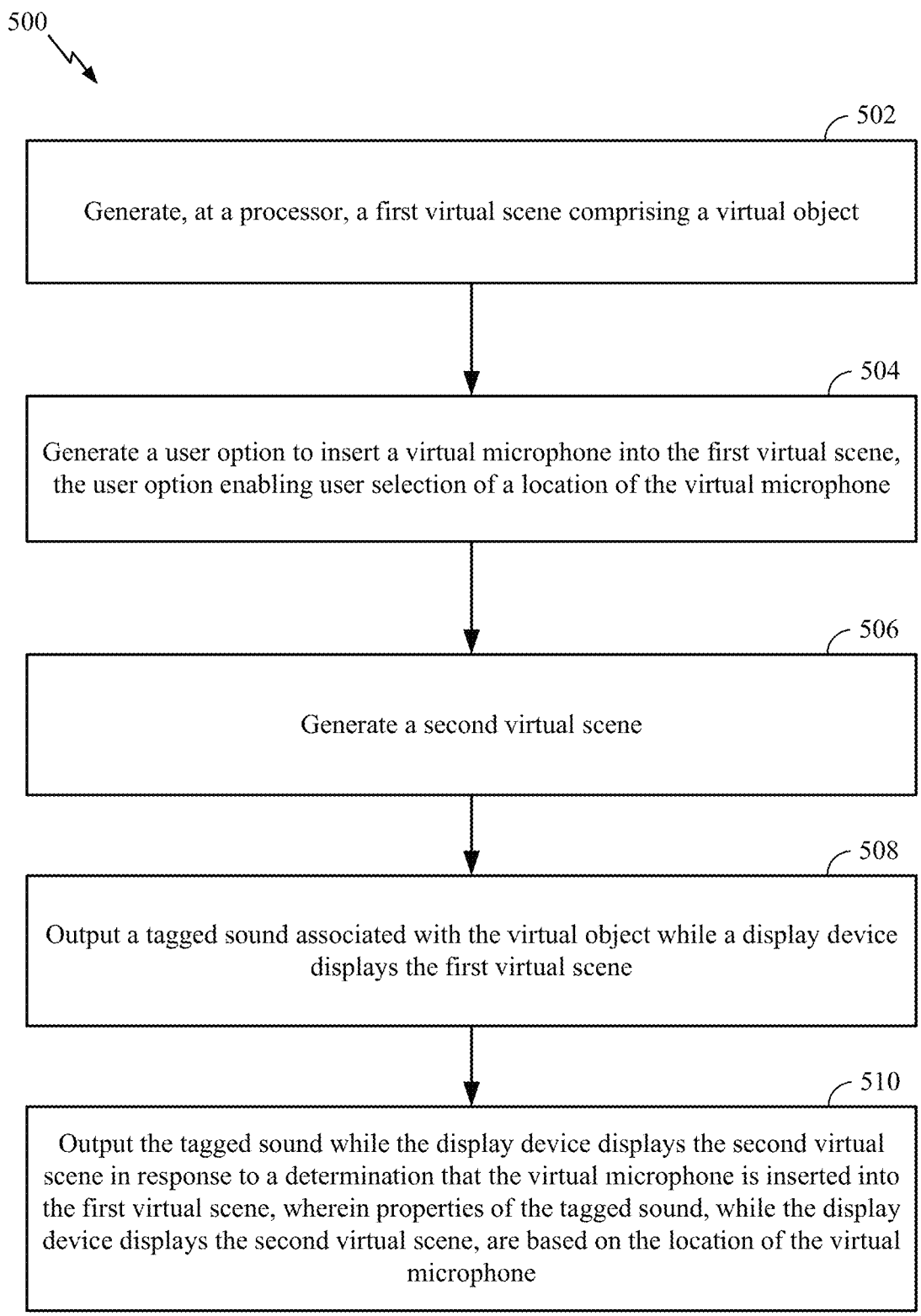
FIG. 5 is a flowchart of an illustrative example of a method for tagging a sound in a virtual environment.

Referring to FIG. 5, a flowchart of a method 500 for tagging a sound in a virtual environment is shown. The method 500 may be performed by the system 100 of FIG. 1, the virtual reality headset 100A of FIG. 4, or both.

The method 500 includes generating, at a processor, a first virtual scene that includes a virtual object, at 502. For example, the virtual scene generator 120 may execute the first virtual scene instructions 132 to generate the first virtual scene 150. The display controller 122 displays the first virtual scene 150 at the display device 106. The first virtual scene 150 may include multiple virtual objects. In the implementation depicted in FIG. 2A, the first virtual scene 150 includes the virtual couch 210, the virtual desk 212, the virtual telephone 214, the virtual chair 216, the virtual clock 218, and the virtual door 220.

The method 500 also includes generating a user option to insert a virtual microphone into the first virtual scene, at 504. The user option enables user selection of a location of the virtual microphone. For example, the virtual microphone insertion unit 124 generates the user option 180 to insert the virtual microphone 160 in the first virtual scene 150. The user option 180 enables the user 202 to select the location of the virtual microphone 160.

The method 500 also includes generating a second virtual scene, at 506. For example, the virtual scene generator 120 may execute the second virtual scene instructions 134 to generate the second virtual scene 152. The display controller 122 displays the second virtual scene 152 at the display device 106. The method 500 also includes outputting a tagged sound associated with the virtual object while a display device displays the first virtual scene, at 508. For example, the sound engine 126 executes the first subroutine 142 while the avatar 204 is located in the first virtual scene 150 render the first audio 154 associated with the first virtual scene 150. The speakers 108 output the rendered first audio 154 as the first virtual scene sounds 190. The first virtual scene sounds 190 include the tagged sound 192.

The method 500 also includes outputting the tagged sound while the display device displays the second virtual scene in response to a determination that the virtual microphone is inserted into the first virtual scene, at 510. Properties of the tagged sound are based on the location of the virtual microphone while the display device displays the second virtual scene. For example, if the user 202 controls the avatar 204 to walk through the virtual door 220, the avatar 204 enters the second virtual scene 152. The sound engine 126 executes the second subroutine 144 when the avatar 204 enters the second virtual scene 152 to render the second audio 156 associated with the second virtual scene 152. The rendered second audio 156 is output by the speakers 108 as the second virtual scene sounds. Additionally, the sound engine 126 continuously executes the subset of instructions 146 in the first subroutine 142 when the avatar 204 enters the second virtual scene 152 to render the tagged audio 158 associated with the virtual microphone 160. The tagged audio 158 is output by the speakers 108 as the tagged sound 192.

The method 500 of FIG. 5 enables the user 202 to tag a location (or virtual object) within the first virtual scene 150 so that the audio associated with the location (e.g., the tagged audio 158) can be heard regardless of whether the first virtual scene 150 is displayed at the display device 106. For example, the user option 180 enables the user to insert the virtual microphone 160 into the first virtual scene 150. In response to inserting the virtual microphone 160, the sound engine 126 continuously executes the subset of instructions 146 to render the tagged audio 158. Thus, if the second virtual scene 152 is displayed at the display device 106, the sound engine 126 executes the second subroutine 144 and the subset of instructions 146 in the first subroutine 142 to render the second audio 156 for the second virtual scene 152 and the tagged audio 158. The speakers 108 can simultaneously output the second virtual scene sounds 194 based on the rendered second audio 156 and the tagged sound 192 based on the tagged audio 158. As a result, while the second virtual scene 152 is displayed at the display device 106, the user can continuously monitor the tagged location within the first virtual scene 150 by listening to the tagged sound 192 through the speakers 108.

Figure 6:
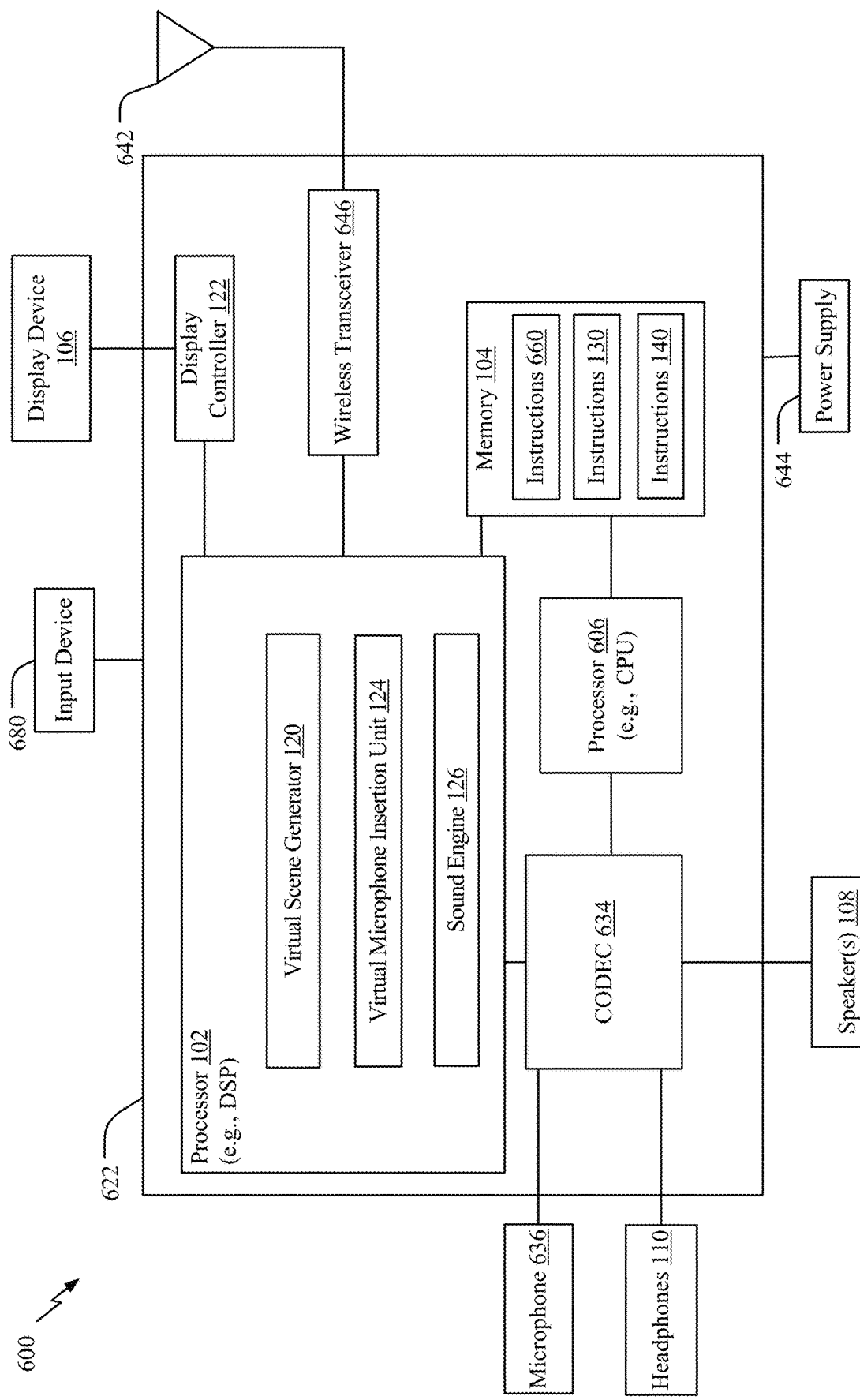
FIG. 6 is a block diagram of a particular illustrative example of a mobile device that is operable to perform the techniques described with reference to FIGS. 1-5.

Referring to FIG. 6, a block diagram of a device 600 that is operable to perform the functions described with respect to FIGS. 1-5 is shown. According to one implementation, the device 600 is a wireless communication device. The device 600 may also correspond to the system 100 of FIG. 1 or the virtual reality headset 100A of FIG. 4.

In a particular implementation, the device 600 includes a processor 606, such as a central processing unit (CPU) or a digital signal processor (DSP), coupled to the memory 104. The memory 104 includes instructions 660 (e.g., executable instructions) such as computer-readable instructions or processor-readable instructions. The instructions 660 may include one or more instructions that are executable by a computer, such as the processor 606 or the processor 102. The memory 104 also includes the scene generation instructions 130 and the sound generation instructions 140.

FIG. 6 also illustrates the display controller 122 that is coupled to the processor 102 and to the display device 106. According to some implementations, the display controller 122 is integrated into the processor 102, as illustrated in FIG. 1. A coder/decoder (CODEC) 634 may also be coupled to the processor 606 and to the processor 102. The headphones 110, the speakers 108, and a microphone 636 are coupled to the CODEC 634.

A wireless transceiver 646 is coupled to the processor 102 and to an antenna 642. In some implementations, the processor 102, the display controller 122, the memory 104, the CODEC 634, the wireless transceiver 646, and the processor 606 are included in a system-in-package or system-on-chip device 622. In some implementations, an input device 680 (e.g., video game controller) and a power supply 644 are coupled to the system-on-chip device 622. Moreover, in a particular implementation, as illustrated in FIG. 6, the display device 106, the input device 680, the headphones 110, the microphone 636, the antenna 642, the speakers 108, and the power supply 644 are external to the system-on-chip device 622.

The device 600 may include a headset, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a component of a vehicle, or any combination thereof, as illustrative, non-limiting examples.

In an illustrative implementation, the memory 104 may include or correspond to a non-transitory computer readable medium storing the instructions 660. The instructions 660 may include one or more instructions that are executable by a computer, such as the processors 102, 606 or the CODEC 634. The instructions 660 may cause the processor 102 to perform one or more operations described herein, including but not limited to one or more portions of the method 500 of FIG. 5.

In a particular implementation, one or more components of the systems and devices disclosed herein may be integrated into a decoding system or apparatus (e.g., an electronic device, a CODEC, or a processor therein), into an encoding system or apparatus, or both. In other implementations, one or more components of the systems and devices disclosed herein may be integrated into a wireless telephone, a tablet computer, a desktop computer, a laptop computer, a set top box, a music player, a video player, an entertainment unit, a television, a game console, a navigation device, a communication device, a personal digital assistant (PDA), a fixed location data unit, a personal media player, or another type of device.

In conjunction with the described techniques, an apparatus includes means for generating a first virtual scene and a second virtual scene. The first virtual scene includes a virtual object. For example, means for generating the first virtual scene and the second virtual scene includes the processor 102, the virtual scene generator 120, the scene generation instructions 130, the first virtual scene instructions 132, the second virtual scene instructions 134, the display controller 122, the display device 106, the display device 106A, the virtual reality headset 100A, one or more other devices, circuits, modules, or any combination thereof.

The apparatus also includes means for generating a user option to insert a virtual microphone into the first virtual scene. The user option enables user selection of a location of the virtual microphone. For example, the means for generating the user option includes the processor 102, the virtual microphone insertion unit 124, one or more other devices, circuits, modules, or any combination thereof.

The apparatus also includes means for outputting a tagged sound associated with the virtual object. For example, the means for outputting includes the speakers 108, the headphones 110, one or more other devices, circuits, modules, or any combination thereof. The tagged sound is outputted while means for displaying a virtual scene displays the first virtual scene. The means for displaying includes the display device 106, the display device 106A, one or more other devices, circuits, modules, or any combination thereof. The tagged sound is outputted while the means for displaying displays the second virtual scene in response to a determination that the virtual microphone is inserted into the first virtual scene. Properties of the tagged sound are based on the location of the virtual microphone while the means for displaying displays the second virtual scene.

Figure 7:
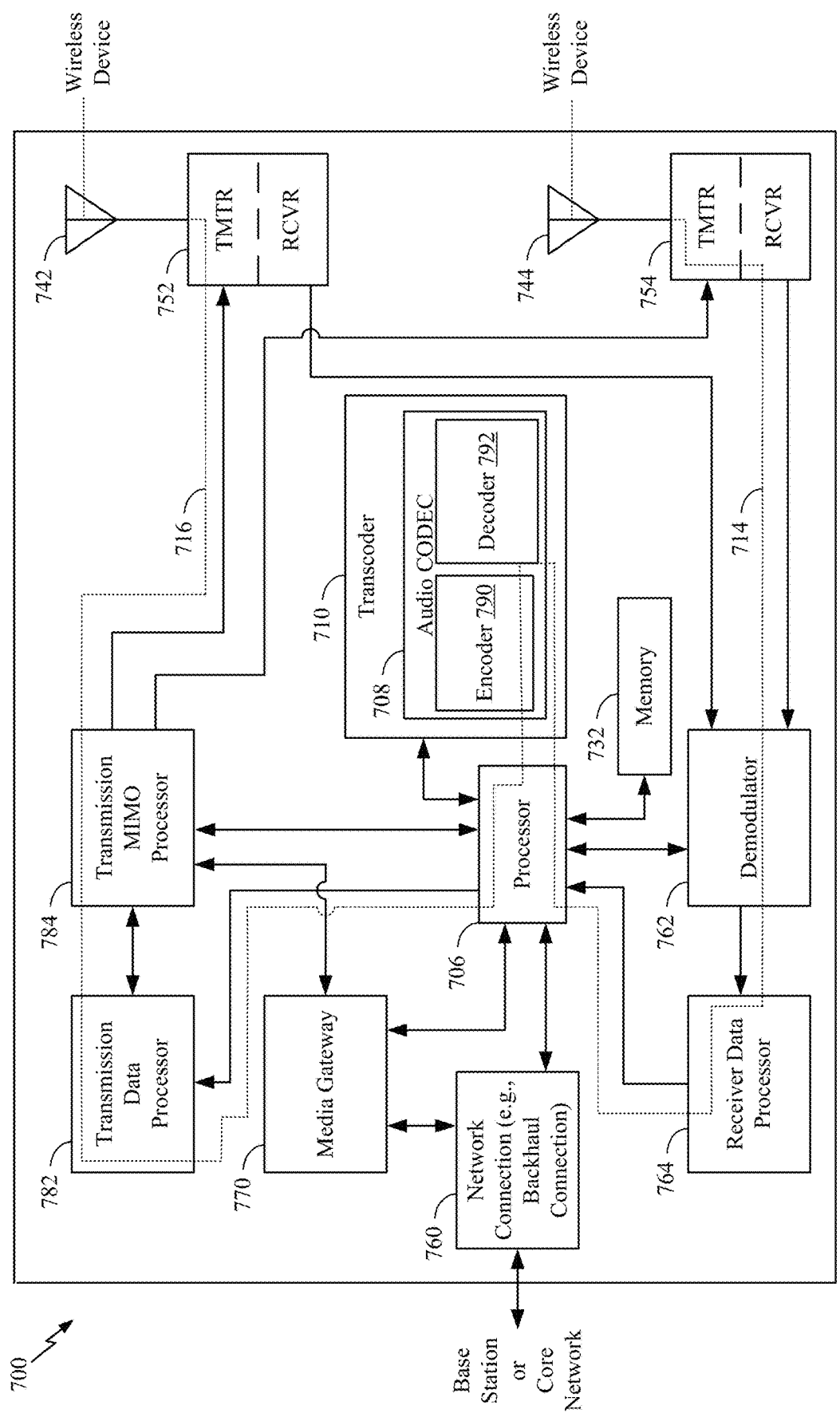
FIG. 7 is a diagram of a particular illustrative example of a base station that is operable to transmit virtual reality scene data and sound data.

Referring to FIG. 7, a block diagram of a particular illustrative example of a base station 700 is depicted. In various implementations, the base station 700 may have more components or fewer components than illustrated in FIG. 7.

The base station 700 may be part of a wireless communication system that includes the system 100. The wireless communication system may include multiple base stations, multiple gaming systems (e.g., gaming consoles), and multiple wireless devices. According to a multi-player implementation, the base station 700 is operable to send information (e.g., video game data) to the processor 102 from a processor (e.g., video game console) associated with another user. The wireless communication system may be a Long Term Evolution (LTE) system, a fourth generation (4G) LTE system, a fifth generation (5G) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to the device 600 of FIG. 6.

Various functions may be performed by one or more components of the base station 700 (and/or in other components not shown), such as sending and receiving messages and data (e.g., scene data and sound data). In a particular example, the base station 700 includes a processor 706 (e.g., a CPU). The base station 700 may include a transcoder 710. The transcoder 710 may include a CODEC 708 (e.g., a scene and sound CODEC). For example, the transcoder 710 may include one or more components (e.g., circuitry) configured to perform operations of the CODEC 708. As another example, the transcoder 710 is configured to execute one or more computer-readable instructions to perform the operations of the CODEC 708. Although the CODEC 708 is illustrated as a component of the transcoder 710, in other examples one or more components of the CODEC 708 may be included in the processor 706, another processing component, or a combination thereof. For example, a decoder 792 may be included in a receiver data processor 764. As another example, an encoder 790 may be included in a transmission data processor 782.

The transcoder 710 may function to transcode messages and data between two or more networks. The transcoder 710 is configured to convert message and audio data from a first format (e.g., a digital format) to a second format. To illustrate, the decoder 792 may decode encoded signals having a first format and the encoder 790 may encode the decoded signals into encoded signals having a second format. Additionally or alternatively, the transcoder 710 is configured to perform data rate adaptation. For example, the transcoder 710 may downconvert a data rate or upconvert the data rate without changing a format of the audio data. To illustrate, the transcoder 710 may downconvert 64 kbit/s signals into 16 kbit/s signals.

The base station 700 includes a memory 732. The memory 732 (an example of a computer-readable storage device) may include instructions. The base station 700 may include multiple transmitters and receivers (e.g., transceivers), such as a first transceiver 752 and a second transceiver 754, coupled to an array of antennas. The array of antennas may include a first antenna 742 and a second antenna 744. The array of antennas is configured to wirelessly communicate with one or more wireless devices, such as the device 600 of FIG. 6. For example, the second antenna 744 may receive a data stream 714 (e.g., a bitstream) from a wireless device. The data stream 714 may include messages, data (e.g., encoded speech data), or a combination thereof.

The base station 700 may include a network connection 760, such as a backhaul connection. The network connection 760 is configured to communicate with a core network or one or more base stations of the wireless communication network. For example, the base station 700 may receive a second data stream (e.g., messages or audio data) from a core network via the network connection 760. The base station 700 may process the second data stream to generate messages or audio data and provide the messages or the audio data to one or more wireless devices via one or more antennas of the array of antennas or to another base station via the network connection 760. In a particular implementation, the network connection 760 may be a wide area network (WAN) connection, as an illustrative, non-limiting example. In some implementations, the core network may include or correspond to a Public Switched Telephone Network (PSTN), a packet backbone network, or both.

The base station 700 may include a media gateway 770 that is coupled to the network connection 760 and the processor 706. The media gateway 770 is configured to convert between media streams of different telecommunications technologies. For example, the media gateway 770 may convert between different transmission protocols, different coding schemes, or both. To illustrate, the media gateway 770 may convert from PCM signals to Real-Time Transport Protocol (RTP) signals, as an illustrative, non-limiting example. The media gateway 770 may convert data between packet switched networks (e.g., a Voice Over Internet Protocol (VoIP) network, an IP Multimedia Subsystem (IMS), a fourth generation (4G) wireless network, such as LTE, WiMax, and UMB, a fifth generation (5G) wireless network, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.).

Additionally, the media gateway 770 may include a transcoder, such as the transcoder 710, and is configured to transcode data when codecs are incompatible. For example, the media gateway 770 may transcode between an Adaptive Multi-Rate (AMR) codec and a G.711 codec, as an illustrative, non-limiting example. The media gateway 770 may include a router and a plurality of physical interfaces. In some implementations, the media gateway 770 may also include a controller (not shown). In a particular implementation, the media gateway controller may be external to the media gateway 770, external to the base station 700, or both. The media gateway controller may control and coordinate operations of multiple media gateways. The media gateway 770 may receive control signals from the media gateway controller and may function to bridge between different transmission technologies and may add service to end-user capabilities and connections.

The base station 700 may include a demodulator 762 that is coupled to the transceivers 752, 754, the receiver data processor 764, and the processor 706, and the receiver data processor 764 may be coupled to the processor 706. The demodulator 762 is configured to demodulate modulated signals received from the transceivers 752, 754 and to provide demodulated data to the receiver data processor 764. The receiver data processor 764 is configured to extract a message or audio data from the demodulated data and send the message or the audio data to the processor 706.

The base station 700 may include a transmission data processor 782 and a transmission multiple input-multiple output (MIMO) processor 784. The transmission data processor 782 may be coupled to the processor 706 and to the transmission MIMO processor 784. The transmission MIMO processor 784 may be coupled to the transceivers 752, 754 and the processor 706. In some implementations, the transmission MIMO processor 784 may be coupled to the media gateway 770. The transmission data processor 782 is configured to receive the messages or the audio data from the processor 706 and to code the messages or the audio data based on a coding scheme, such as CDMA or orthogonal frequency-division multiplexing (OFDM), as an illustrative, non-limiting examples. The transmission data processor 782 may provide the coded data to the transmission MIMO processor 784.

The coded data may be multiplexed with other data, such as pilot data, using CDMA or OFDM techniques to generate multiplexed data. The multiplexed data may then be modulated (i.e., symbol mapped) by the transmission data processor 782 based on a particular modulation scheme (e.g., Binary phase-shift keying ("BPSK"), Quadrature phase-shift keying ("QSPK"), M-ary phase-shift keying ("M-PSK"), M-ary Quadrature amplitude modulation ("M-QAM"), etc.) to generate modulation symbols. In a particular implementation, the coded data and other data may be modulated using different modulation schemes. The data rate, coding, and modulation for each data stream may be determined by instructions executed by processor 706.

The transmission MIMO processor 784 is configured to receive the modulation symbols from the transmission data processor 782 and may further process the modulation symbols and may perform beamforming on the data. For example, the transmission MIMO processor 784 may apply beamforming weights to the modulation symbols.

During operation, the second antenna 744 of the base station 700 may receive a data stream 714. The second transceiver 754 may receive the data stream 714 from the second antenna 744 and may provide the data stream 714 to the demodulator 762. The demodulator 762 may demodulate modulated signals of the data stream 714 and provide demodulated data to the receiver data processor 764. The receiver data processor 764 may extract audio data from the demodulated data and provide the extracted audio data to the processor 706.

The processor 706 may provide the audio data to the transcoder 710 for transcoding. The decoder 792 of the transcoder 710 may decode the audio data from a first format into decoded audio data, and the encoder 790 may encode the decoded audio data into a second format. In some implementations, the encoder 790 may encode the audio data using a higher data rate (e.g., upconvert) or a lower data rate (e.g., downconvert) than received from the wireless device. In other implementations, the audio data may not be transcoded. Although transcoding (e.g., decoding and encoding) is illustrated as being performed by a transcoder 710, the transcoding operations (e.g., decoding and encoding) may be performed by multiple components of the base station 700. For example, decoding may be performed by the receiver data processor 764 and encoding may be performed by the transmission data processor 782. In other implementations, the processor 706 may provide the audio data to the media gateway 770 for conversion to another transmission protocol, coding scheme, or both. The media gateway 770 may provide the converted data to another base station or core network via the network connection 760.

Encoded audio data generated at the encoder 792, such as transcoded data, may be provided to the transmission data processor 782 or the network connection 760 via the processor 706. The transcoded audio data from the transcoder 710 may be provided to the transmission data processor 782 for coding according to a modulation scheme, such as OFDM, to generate the modulation symbols. The transmission data processor 782 may provide the modulation symbols to the transmission MIMO processor 784 for further processing and beamforming. The transmission MIMO processor 784 may apply beamforming weights and may provide the modulation symbols to one or more antennas of the array of antennas, such as the first antenna 742 via the first transceiver 752. Thus, the base station 700 may provide a transcoded data stream 716, that corresponds to the data stream 714 received from the wireless device, to another wireless device. The transcoded data stream 716 may have a different encoding format, data rate, or both, than the data stream 714. In other implementations, the transcoded data stream 716 may be provided to the network connection 760 for transmission to another base station or a core network.

The foregoing techniques may be performed with respect to any number of different contexts and audio ecosystems. A number of example contexts are described below, although the techniques should be limited to the example contexts. One example audio ecosystem may include audio content, movie studios, music studios, gaming audio studios, channel based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel based audio content (e.g., in 2.0, 5.1, and 7.1) such as by using a digital audio workstation (DAW). The music studios may output channel based audio content (e.g., in 2.0, and 5.1) such as by using a DAW. In either case, the coding engines may receive and encode the channel based audio content based one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel based audio content for output by the delivery systems. Another example context in which the techniques may be performed includes an audio ecosystem that may include broadcast recording audio objects, professional audio systems, consumer on-device capture, HOA audio format, on-device rendering, consumer audio, TV, and accessories, and car audio systems.

The broadcast recording audio objects, the professional audio systems, and the consumer on-device capture may all code their output using HOA audio format. In this way, the audio content may be coded using the HOA audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.).

Other examples of context in which the techniques may be performed include an audio ecosystem that may include acquisition elements, and playback elements. The acquisition elements may include wired and/or wireless acquisition devices (e.g., Eigen microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a sound field. For instance, the mobile device may acquire a sound field via the wired and/or wireless acquisition devices and/or the on-device surround sound capture (e.g., a plurality of microphones integrated into the mobile device). The mobile device may then code the acquired sound field into the HOA coefficients for playback by one or more of the playback elements. For instance, a user of the mobile device may record (acquire a sound field of) a live event (e.g., a meeting, a conference, a play, a concert, etc.), and code the recording into HOA coefficients.

The mobile device may also utilize one or more of the playback elements to playback the HOA coded sound field. For instance, the mobile device may decode the HOA coded sound field and output a signal to one or more of the playback elements that causes the one or more of the playback elements to recreate the sound field. As one example, the mobile device may utilize the wireless and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a set of headphones, e.g., to create realistic binaural sound.

In some examples, a particular mobile device may both acquire a 3D sound field and playback the same 3D sound field at a later time. In some examples, the mobile device may acquire a 3D sound field, encode the 3D sound field into HOA, and transmit the encoded 3D sound field to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of HOA signals. For instance, the one or more DAWs may include HOA plugins and/or tools which may be configured to operate with (e.g., work with) one or more game audio systems. In some examples, the game studios may output new stem formats that support HOA. In any case, the game studios may output coded audio content to the rendering engines which may render a sound field for playback by the delivery systems.

The mobile device may also, in some instances, include a plurality of microphones that are collectively configured to record a 3D sound field. In other words, the plurality of microphone may have X, Y, Z diversity. In some examples, the mobile device may include a microphone which may be rotated to provide X, Y, Z diversity with respect to one or more other microphones of the mobile device.

Example audio playback devices that may perform various aspects of the techniques described in this disclosure are further discussed below. In accordance with one or more techniques of this disclosure, speakers and/or sound bars may be arranged in any arbitrary configuration while still playing back a 3D sound field. In accordance with one or more techniques of this disclosure, a single generic representation of a sound field may be utilized to render the sound field on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a sound field may be utilized to render the sound field on any of the foregoing playback environments. Additionally, the techniques of this disclosure enable a rendered to render a sound field from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a render to compensate with the other 6 speakers such that playback may be achieved on a 6.1 speaker playback environment.

Moreover, a user may watch a sports game while wearing headphones. In accordance with one or more techniques of this disclosure, the 3D sound field of the sports game may be acquired (e.g., one or more Eigen microphones may be placed in and/or around the baseball stadium), HOA coefficients corresponding to the 3D sound field may be obtained and transmitted to a decoder, the decoder may reconstruct the 3D sound field based on the HOA coefficients and output the reconstructed 3D sound field to a renderer, the renderer may obtain an indication as to the type of playback environment (e.g., headphones), and render the reconstructed 3D sound field into signals that cause the headphones to output a representation of the 3D sound field of the sports game.

It should be noted that various functions performed by the one or more components of the systems and devices disclosed herein are described as being performed by certain components or modules. This division of components and modules is for illustration only. In an alternate implementation, a function performed by a particular component or module may be divided amongst multiple components or modules. Moreover, in an alternate implementation, two or more components or modules may be integrated into a single component or module. Each component or module may be implemented using hardware (e.g., a field-programmable gate array (FPGA) device, an application-specific integrated circuit (ASIC), a DSP, a controller, etc.), software (e.g., instructions executable by a processor), or any combination thereof.

Those of skill would further appreciate that the various illustrative logical blocks, configurations, modules, circuits, and algorithm steps described in connection with the implementations disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:
    a display device;
    a processor coupled to the display device, the processor configured to:
        generate a first virtual scene comprising a virtual object;
        generate a user option to insert a virtual microphone into the first virtual scene, the user option enabling user selection of a location of the virtual microphone; and
        generate a second virtual scene; and a speaker coupled to the processor, the speaker configured to:
output a tagged sound associated with the virtual object while the display device displays the first virtual scene; and
output the tagged sound while the display device displays the second virtual scene in response to a determination that the virtual microphone is inserted into the first virtual scene, wherein properties of the tagged sound, while the display device displays the second virtual scene, are based on the location of the virtual microphone.

2. The apparatus of claim 1, wherein the user option further enables user selection of an orientation of the virtual microphone, and wherein the properties of the tagged sound, while the display device displays the second virtual scene, are further based on the orientation of the virtual microphone.

3. The apparatus of claim 1, further comprising a virtual reality headset, wherein the display device, the speaker, and the processor are integrated within the virtual reality headset.

4. The apparatus of claim 1, further comprising:
a memory storing:
a first subroutine corresponding to first audio of the first virtual scene; and
a second subroutine corresponding to second audio of the second virtual scene; and
a sound engine integrated into the processor, the sound engine configured to:
execute the first subroutine to render the first audio while the display device displays the first virtual scene, the rendered first audio output by the speaker as first virtual scene sounds associated with the first virtual scene; and
execute the second subroutine to render the second audio while the display device displays the second virtual scene, the rendered second audio output by the speaker as second virtual scene sounds associated with the second virtual scene.

5. The apparatus of claim 4, wherein in response to the determination that the virtual microphone is inserted into the first virtual scene, the sound engine is further configured to:
continuously execute a subset of instructions in the first subroutine to render tagged audio of the first virtual scene, the tagged audio based on the location of the virtual microphone, and the rendered tagged audio output by the speaker as the tagged sound.

6. The apparatus of claim 5, wherein the processor is further configured to identify the location of the virtual microphone, and wherein the subset of instructions is associated with the identified location.

7. The apparatus of claim 1, wherein the display device, the processor, and the speaker are integrated into a mobile device.

8. The apparatus of claim 1, further comprising a base station and a user device, wherein the user device includes the display device, the processor, and the speaker, and wherein the base station is configured to send data to the processor.

9. A method comprising:
generating, at a processor, a first virtual scene comprising a virtual object;
generating a user option to insert a virtual microphone into the first virtual scene, the user option enabling user selection of a location of the virtual microphone;
generating a second virtual scene;
outputting a tagged sound associated with the virtual object while a display device displays the first virtual scene; and
outputting the tagged sound while the display device displays the second virtual scene in response to a determination that the virtual microphone is inserted into the first virtual scene, wherein properties of the tagged sound, while the display device displays the second virtual scene, are based on the location of the virtual microphone.

10. The method of claim 9, wherein the user option further enables user selection of an orientation of the virtual microphone, and wherein the properties of the tagged sound, while the display device displays the second virtual scene, are further based on the orientation of the virtual microphone.

11. The method of claim 9, wherein the display device is integrated into a virtual reality headset.

12. The method of claim 9, further comprising:
executing, at the processor, a first subroutine to render the first audio while the display device displays the first virtual scene, the rendered first audio output by the speaker as first virtual scene sounds associated with the first virtual scene; and
executing a second subroutine to render the second audio while the display device displays the second virtual scene, the rendered second audio output by the speaker as second virtual scene sounds associated with the second virtual scene.

13. The method of claim 12, further comprising, in response to the determination that the virtual microphone is inserted into the first virtual scene:
continuously executing a subset of instructions of the first subroutine to render tagged audio of the first virtual scene, the tagged audio based on the location of the virtual microphone, and the rendered tagged audio output by the speaker as the tagged sound.

14. The method of claim 13, further comprising identifying the location of the virtual microphone, and wherein the subset of instructions is associated with the identified location.

15. A non-transitory computer-readable medium comprising instructions that, when executed by a processor, cause the processor to perform operations comprising:
generating a first virtual scene comprising a virtual object;
generating a user option to insert a virtual microphone into the first virtual scene, the user option enabling user selection of a location of the virtual microphone;
generating a second virtual scene;
outputting a tagged sound associated with the virtual object while a display device displays the first virtual scene; and
outputting the tagged sound while the display device displays the second virtual scene in response to a determination that the virtual microphone is inserted into the first virtual scene, wherein properties of the tagged sound, while the display device displays the second virtual scene, are based on the location of the virtual microphone.

16. The non-transitory computer-readable medium of claim 15, wherein the user option further enables user selection of an orientation of the virtual microphone, and wherein the properties of the tagged sound, while the display device displays the second virtual scene, are further based on the orientation of the virtual microphone.

17. The non-transitory computer-readable medium of claim 15, wherein the operations further comprise:
  executing a first subroutine to render the first audio while the display device displays the first virtual scene, the rendered first audio output by the speaker as first virtual scene sounds associated with the first virtual scene; and
  executing a second subroutine to render the second audio while the display device displays the second virtual scene, the rendered second audio output by the speaker as second virtual scene sounds associated with the second virtual scene.

18. The non-transitory computer-readable medium of claim 17, wherein in response to the determination that the virtual microphone is inserted into the first virtual scene, the operations further comprise:
  continuously executing a subset of instructions of the first subroutine to render tagged audio of the first virtual scene, the tagged audio based on the location of the virtual microphone, and the rendered tagged audio output by the speaker as the tagged sound.

19. The non-transitory computer-readable medium of claim 18, wherein the operations further comprise identifying the location of the virtual microphone, the subset of instructions associated with the identified location.

20. An apparatus comprising:
  a processor configured to:
    generate a first virtual scene and a second virtual scene, the first virtual scene comprising a virtual object;
    generate a user option to insert a virtual microphone into the first virtual scene, the user option enabling user selection of a location of the virtual microphone; and
    output a tagged sound associated with the virtual object, the tagged sound outputted while a display device displays the first virtual scene, and the tagged sound outputted while the display device displays the second virtual scene in response to a determination that the virtual microphone is inserted into the first virtual scene, wherein properties of the tagged sound, while the display device displays the second virtual scene, are based on the location of the virtual microphone.

21. The apparatus of claim 20, wherein the user option further enables user selection of an orientation of the virtual microphone, and wherein the properties of the tagged sound, while the display device displays the second virtual scene, are further based on the orientation of the virtual microphone.

* * * * *